US011581000B2

(12) United States Patent
Lim et al.

(10) Patent No.: US 11,581,000 B2
(45) Date of Patent: Feb. 14, 2023

(54) APPARATUS AND METHOD FOR ENCODING/DECODING AUDIO SIGNAL USING INFORMATION OF PREVIOUS FRAME

(71) Applicant: Electronics and Telecommunications Research Institute, Daejeon (KR)

(72) Inventors: Woo-Taek Lim, Daejeon (KR); Seung Kwon Beack, Daejeon (KR); Jongmo Sung, Daejeon (KR); Mi Suk Lee, Daejeon (KR); Tae Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 119 days.

(21) Appl. No.: 17/105,835

(22) Filed: Nov. 27, 2020

(65) Prior Publication Data
US 2021/0166706 A1 Jun. 3, 2021

(30) Foreign Application Priority Data
Nov. 29, 2019 (KR) .......................... 10-2019-0157168

(51) Int. Cl.
| | | |
|---|---|---|
| *G10L 19/00* | (2013.01) | |
| *G10L 25/30* | (2013.01) | |
| *G10L 19/16* | (2013.01) | |
| *G06N 3/08* | (2023.01) | |
| *G10L 19/038* | (2013.01) | |

(52) U.S. Cl.
CPC .............. *G10L 19/167* (2013.01); *G06N 3/08* (2013.01); *G10L 19/038* (2013.01); *G10L 25/30* (2013.01)

(58) Field of Classification Search
CPC ..... G10L 19/00; G10L 25/00; G10L 2025/00; G06N 3/00
See application file for complete search history.

(56) References Cited

U.S. PATENT DOCUMENTS

| | | |
|---|---|---|
| 10,452,978 B2 | 10/2019 | Shazeer et al. |
| 2009/0171671 A1 | 7/2009 | Seo et al. |
| 2018/0365554 A1 | 12/2018 | van den Oord et al. |
| 2019/0164052 A1* | 5/2019 | Sung ...................... G06N 3/088 |
| 2020/0234725 A1* | 7/2020 | Garbacea ................ G10L 19/16 |
| 2020/0357387 A1* | 11/2020 | Prabhavalkar .......... G10L 15/16 |

(Continued)

OTHER PUBLICATIONS

Chorowski, J., Weiss, R. J., Bengio, S., & Van Den Oord, A. (2019). Unsupervised speech representation learning using wavenet autoencoders. IEEE/ACM transactions on audio, speech, and language processing, 27(12), 2041-2053. (Year: 2019).*

(Continued)

*Primary Examiner* — Jialong He
(74) *Attorney, Agent, or Firm* — William Park & Associates Ltd.

(57) ABSTRACT

Disclosed is an apparatus and method for encoding/decoding an audio signal using information of a previous frame. An audio signal encoding method includes: generating a current latent vector by reducing dimension of a current frame of an audio signal; generating a concatenation vector by concatenating a previous latent vector generated by reducing dimension of a previous frame of the audio signal with the current latent vector; and encoding and quantizing the concatenation vector.

2 Claims, 9 Drawing Sheets

(56) References Cited

U.S. PATENT DOCUMENTS

2021/0142812 A1* 5/2021 Kim ................. G10L 19/032

OTHER PUBLICATIONS

Klejsa, J., Hedelin, P., Zhou, C., Fejgin, R., & Villemoes, L. (May 2019). High-quality speech coding with sample RNN. In ICASSP 2019-2019 IEEE International Conference on Acoustics, Speech and Signal Processing (ICASSP) (pp. 7155-7159). IEEE. (Year: 2019).*

Julien Despois, "Latent space visualization—Deep Learning bits #2", [online] "https://hackernoon.com", published 2017. (Year: 2017).*

Shin, Seong-Hyeon, et al. "Enhanced method of audio coding using CNN-based spectral recovery with adaptive structure." ICASSP 2020, IEEE International Conference on Acoustics, Speech and Signal Processing (ICASSP), May 4, 2020. (Year: 2020).*

Shin, Seong-Hyeon, et al. "Audio coding based on spectral recovery by convolutional neural network." IEEE International Conference on Acoustics, Speech and Signal Processing (ICASSP). IEEE, Apr. 2019. (Year: 2019).*

Jan Chorowski et al., Unsupervised Speech Representation Learning Using WaveNet Autoencoders, IEEE/ACM Transactions on Audio, Speech, and Language Processing, vol. 27, No. 12, Dec. 2019, Sep. 2, 2019, pp. 2041-2053.

Xin Wang et al., A Vector Quantized Variational Autoencoder (VQ-VAE) Autoregressive Neural F0 Model for Statistical Parametric Speech Synthesis, IEEE/ACM Transactions on Audio, Speech, and Language Processing, vol. 28, 2020, Oct. 28, 2019, pp. 157-170.

* cited by examiner

APPARATUS AND METHOD FOR ENCODING/DECODING AUDIO SIGNAL USING INFORMATION OF PREVIOUS FRAME

CROSS-REFERENCE TO RELATED APPLICATION(S)

This application claims the priority benefit of Korean Patent Application No. 10-2019-0157168 filed on Nov. 29, 2019 in the Korean Intellectual Property Office, the disclosures of which are incorporated herein by reference for all purposes.

BACKGROUND

1. Field

One or more example embodiments relate to an apparatus and method for encoding/decoding an audio signal, and more particularly, to an apparatus and method for encoding/decoding a current frame of an audio signal by using a vector generated from a previous frame of the audio signal.

2. Description of Related Art

MPEG audio technology has been developed by designing a quantizer based on a human psychoacoustic model and compressing data in order to minimize perceptual sound quality loss, and the technology with the greatest success in the industry is MPEG-1 Layer III (MP3).

MP3 have the psychoacoustic model due to the structural constraints that have to perform a hybrid frequency transformation process of a combination of QMF (Quadrature Mirror Filterbank) and MDCT (Modified Discrete Cosine Transform) to provide compatibility with existing layers.

Accordingly, MPEG-2 Advanced Audio Coding (AAC) was developed. AAC may apply a psychoacoustic model to MDCT-based full-band audio frequency coefficients, and achieves more than 30% compression performance compared to MP3.

However, the audio core coding technology that provides a compression rate of 30% or more compared to AAC is slow in development and standardization is not in progress.

That is, although MPEG audio compression technology has achieved a dramatic improvement in compression performance using a psychoacoustic model, it is interpreted that a quantization strategy based on a one-dimensional psychoacoustic model has reached the limit of performance.

Therefore, a method of increasing the coding efficiency compared to the existing compression technology is requested.

SUMMARY

At least one example embodiment provides an apparatus and method for enhancing encoding efficiency and improving the quality of restored signals by compressing information into a latent vector by reducing the dimensions of an audio signal, and encoding a latent vector of a previous frame by concatenating a latent vector of the current frame with the latent vector of a previous frame.

According to an aspect of at least one example embodiment, there is provided a method for encoding audio signal, comprising generating a current latent vector by reducing a dimension of a current frame of an audio signal; generating a concatenation vector by concatenating a previous latent vector generated by reducing a dimension of a previous frame of the audio signal with the current latent vector; and encoding and quantizing the concatenation vector to output a bit stream.

The generating the current latent vector reduces the dimension of the current frame of the audio signal using a neural network, wherein the neural network learns is trained according to a loss function of the current latent vector calculated by setting the previous latent vector as a conditional probability.

The generating the current latent vector reduces the dimension of the current frame of the audio signal using a neural network, wherein the neural network is trained according to an entropy of the current latent vector calculated by setting the previous latent vector as a conditional probability.

According to an aspect of at least one example embodiment, there is provided a method for decoding audio signal, comprising decoding a current frame of the received bit stream to restore a current latent vector; generating an association vector by associating a previous latent vector reconstructed by decoding a previous frame of the bit stream with the current latent vector; and decoding the association vector to restore an audio signal, wherein the current latent vector is generated by reducing a dimension of the current frame of the audio signal.

According to an aspect of at least one example embodiment, there is provided a method for encoding audio signal, comprising generating a condition vector for a current frame of an audio signal using a previous latent vector generated by reducing a dimension of a previous frame of the audio signal; generating a current latent vector by reducing a dimension of the current frame of the audio signal in a neural network to which the condition vector is applied; and encoding and quantizing the current latent vector to output a bit stream.

The generating the condition vector generates the condition vector by projecting the embedding space of the previous latent vector to another dimension.

The generating the condition vector generates the condition vector by transforming and compressing the previous latent vector in another neural network different from the neural network.

According to an aspect of at least one example embodiment, there is provided a method for decoding audio signal, comprising generating a condition vector for a current frame of an audio signal using a previous latent vector generated by reducing dimension of a previous frame of a bit stream; generating a current latent vector by reducing dimension of the current frame of the audio signal in a neural network to which the condition vector is applied and decoding the current latent vector to restore the audio signal.

The generating the condition vector generates the condition vector by projecting an embedding space of the previous latent vector to another dimension.

The generating the condition vector generates the condition vector by transforming and compressing the previous latent vector with another neural network different from the neural network.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
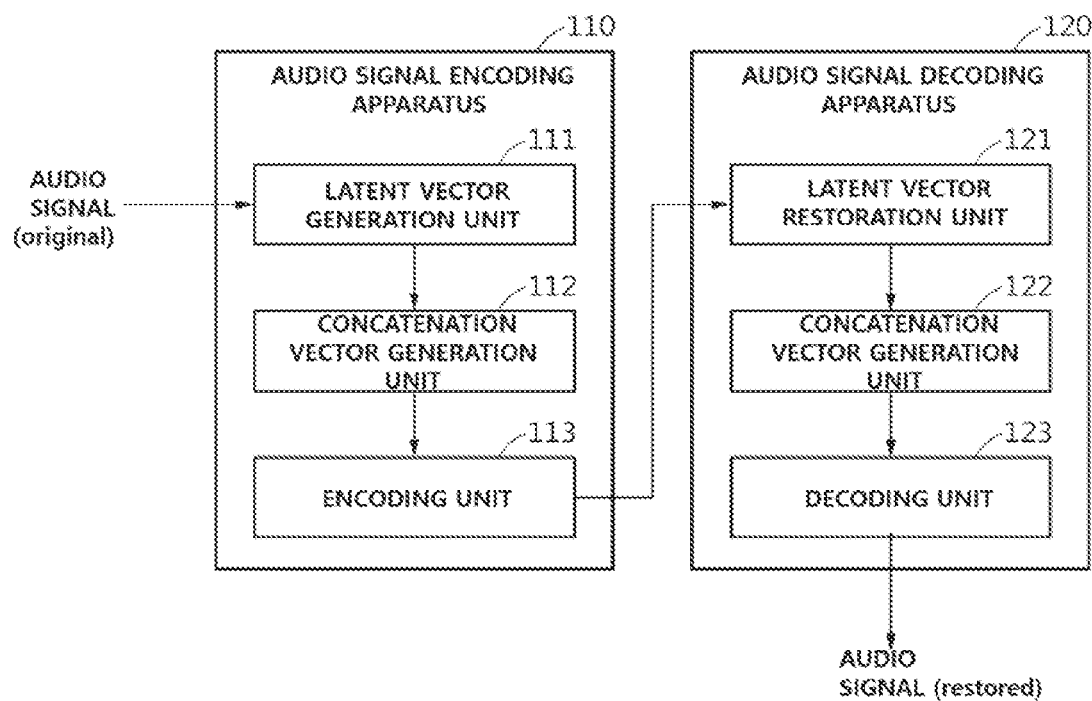
FIG. 1 illustrates an audio signal encoding apparatus and an audio signal decoding apparatus according to a first embodiment of the present invention.

Hereinafter, some example embodiments will be described in detail with reference to the accompanying drawing. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected," "coupled," or "joined" to another component, a third component may be "connected," "coupled," and "joined" between the first and second components, although the first component may be directly connected, coupled, or joined to the second component. On the contrary, it should be noted that if it is described that one component is "directly connected," "directly coupled," or "directly joined" to another component, a third component may be absent. Expressions describing a relationship between components, for example, "between," directly between," or "directly neighboring," etc., should be interpreted to be alike.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 illustrates an audio signal encoding apparatus and an audio signal decoding apparatus according to a first embodiment of the present invention.

The audio signal encoding apparatus 110 may include a latent vector generation unit 111, a concatenation vector generation unit 112, and an encoding unit 113 as shown in FIG. 1. At this time, the latent vector generation unit 111, the concatenation vector generation unit 112, and the encoding unit 113 are different processors included in the audio signal encoding apparatus 110, or are executed by one processor.

Also, the audio signal input to the audio signal encoding apparatus 110 may be a 1D audio signal or a 2D audio signal, and may be composed of a plurality of frames.

The latent vector generation unit 111 may generate a current latent vector by reducing dimension of a current frame of the audio signal. In this case, the latent vector generation unit 111 may dimensionally reduce the current frame of the audio signal using a neural network. At this time, the dimension of the latent vector may be set with a hyper parameter.

In this case, the neural network may be trained according to a loss function of the current latent vector. In addition, the loss function of the current latent vector may be calculated by setting a previous latent vector as a conditional probability. In this case, the latent vector generation unit 111 may calculate the loss function of the current latent vector using a loss of a reconstructed signal and a loss of entropy for lower entropy in a latent dimension. Also, the previous latent vector may be a vector generated by reducing dimension of the previous frame of the audio signal.

Specifically, the latent vector generation unit 111 may store the latent vector generated in the process of processing the previous frame of the audio signal as a previous latent vector of the audio signal in a cache or other storage medium. In the process of processing the current frame of the audio signal, the latent vector generation unit 111 or the concatenation vector generation unit 112 may load and use a previous latent vector of the audio signal stored in a cache or other storage medium.

Further, the neural network is trained according to the entropy of the current latent vector, and the entropy of the current latent vector may be calculated by setting the previous latent vector as a conditional probability.

The concatenation vector generation unit 112 may generate a concatenation vector by concatenating the previous latent vector with the current latent vector. In this case, the concatenation vector generation unit 112 may generate the concatenation vector by combining the previous latent vector and the current latent vector.

The encoding unit 113 may encode and quantize the concatenation vector generated by the concatenation vector generation unit 112 to output a bit stream. In this case, the encoding unit 113 may input and encode the concatenation vector into an encoding neural network.

The audio signal decoding apparatus 120 may include a latent vector restoration unit 121, a concatenation vector generation unit 122, and a decoding unit 123. At this time, the latent vector restoration unit 121, the concatenation vector generation unit 122, and the decoding unit 123 are different processors included in the audio signal decoding apparatus 120, respectively It may be a module of.

The latent vector restoration unit 121 may reconstruct the current latent vector by decoding the current frame of the bit stream received from the audio encoding apparatus 110.

In this case, the latent vector restoration it 121 may store the restored latent vector in a process of processing the previous frame of the bit stream as a previous latent vector in a cache or other storage medium. In the process of processing the current frame of the bit stream, the concatenation vector generation unit 122 may load and use a previous latent vector stored in a cache or other storage medium.

The concatenation vector generation unit 122 may generate a concatenation vector by concatenating the previous latent vector with the current latent vector.

The decoding unit 123 may restore the audio signal by decoding the concatenation vector generated by the concatenation vector generation unit 122. In this case, the decoder 123 may decode the concatenation vector by inputting it into a decoding neural network.

The audio signal encoding apparatus 110 and the audio signal decoding apparatus 120 compress the information into a latent vector by reducing dimension of the audio signal, and encode the latent vector of the previous frame in concatenation with the latent vector of the current frame to improve encoding efficiency. As a result, the quality of the restored signal may improve.

Figure 2:
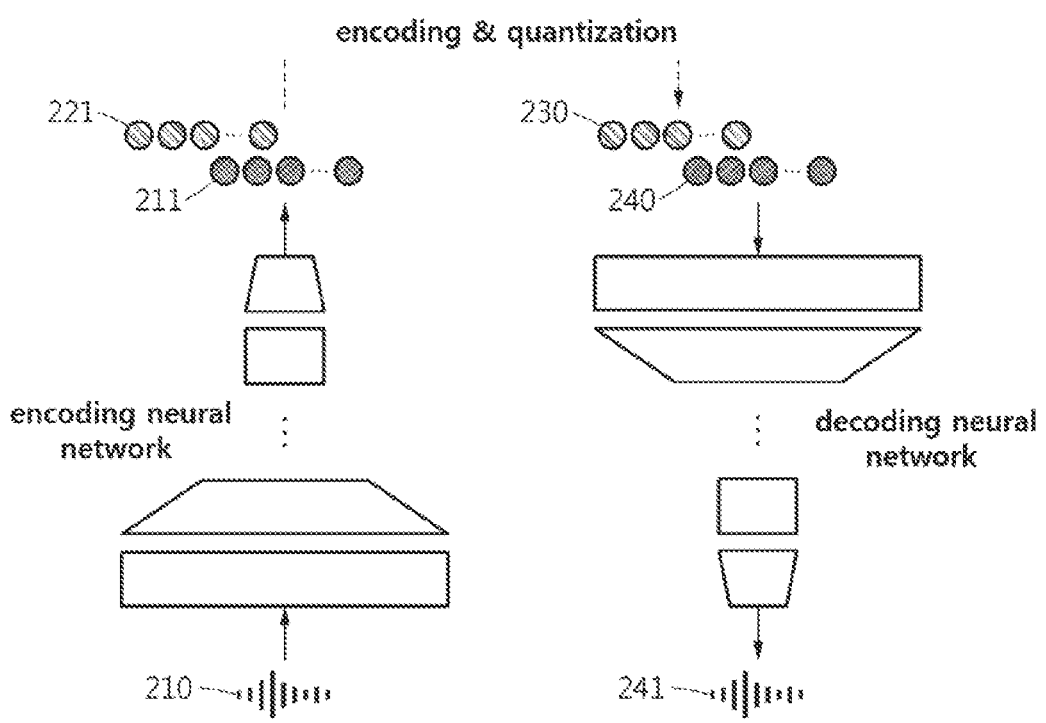
FIG. 2 illustrates a process of encoding and decoding an audio signal according to the first embodiment of the present invention.

FIG. 2 illustrates a process of encoding and decoding an audio signal according to the first embodiment of the present invention.

The audio signal encoding apparatus 110 may reduce a dimension of the current frame of the audio signal 210 and compress information into a latent vector 211 of the current frame. Further, the audio signal encoding apparatus 110 generates concatenation vector by performing concatenation the latent vector 211 of the current frame with the latent vector 221 of the previous frame and generates bitstream by encoding and quantizing the concatenation vector. The latent vector 221 of the previous frame is generated by reducing the dimension of the previous frame.

The audio signal decoding apparatus 120 inputs a concatenation vector obtained by combining the latent vector 240 of the current frame reconstructed from the bit stream and the latent vector 230 of the previous frame restored from the bit stream to the decoding unit and restores the audio signal 241.

Figure 3:
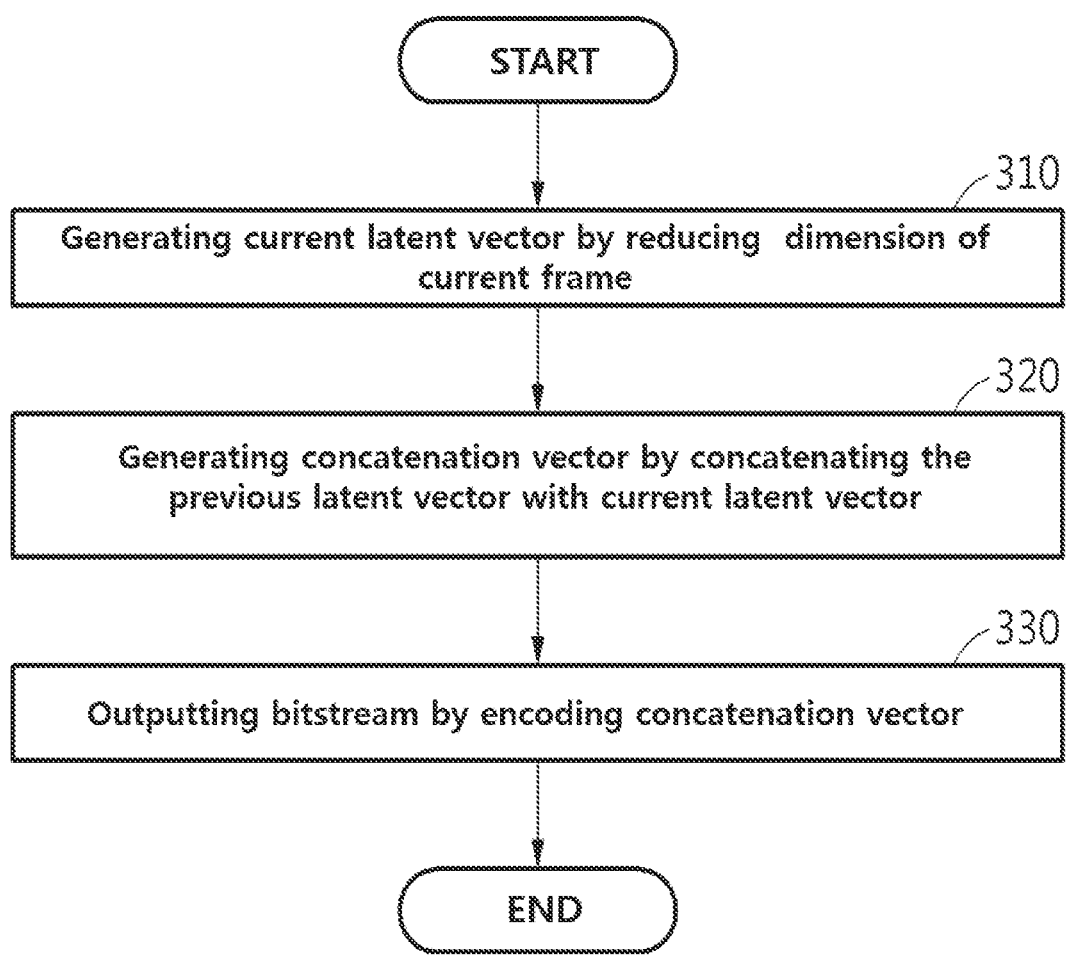
FIG. 3 illustrates a flowchart illustrating a method of encoding an audio signal according to the first embodiment of the present invention.

FIG. 3 illustrates a flowchart illustrating a method of encoding an audio signal according to the first embodiment of the present invention.

In step 310, the latent vector generation unit 111 may generate a current latent vector by reducing dimension of the current frame of the audio signal. In this case, the neural network may be trained according to the loss function of the current latent vector. And, the loss function of the current latent vector may be calculated by setting the previous latent vector as a conditional probability. In addition, the latent vector generation unit 111 may calculate a loss function of the current latent vector using a loss of a reconstructed signal and a loss of entropy in order to lower entropy in a latent dimension.

In step 320, the concatenation vector generation unit 112 may generate a concatenation vector by concatenating a previous latent vector generated by reducing dimension of the previous frame of the audio signal with the current latent vector generated in step 310. In this case, the concatenation vector generation unit 112 may generate a concatenation vector by combining the previous latent vector and the current latent vector.

In step 330, the encoding unit 113 may encode and quantize the concatenation vector generated in step 330 to output a bit stream. In this case, the encoding unit 113 may input and encode the concatenation vector into an encoding neural network.

Figure 4:
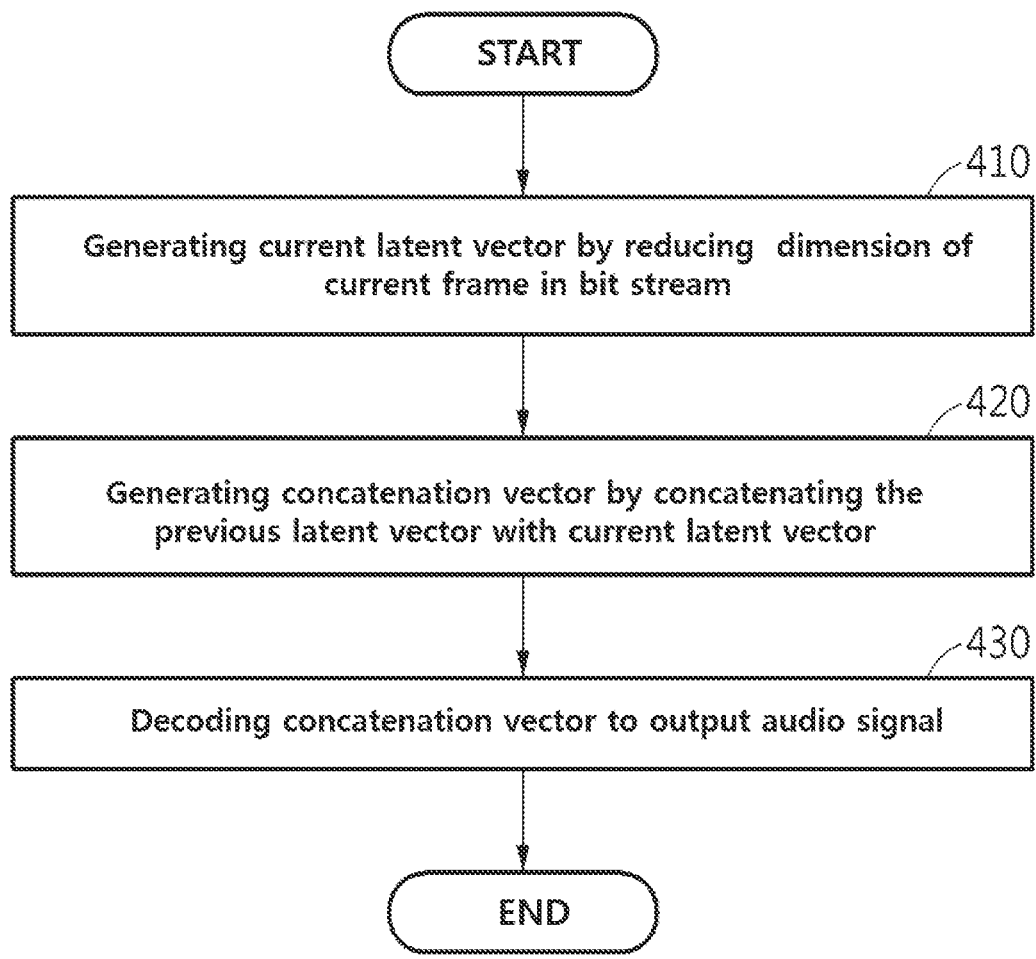
FIG. 4 illustrates a flowchart showing a method of decoding an audio signal according to the first embodiment of the present invention.

FIG. 4 illustrates a flowchart showing a method of decoding an audio signal according to the first embodiment of the present invention.

In step 410, the latent vector reconstruction unit 121 may reconstruct the current latent vector by decoding the current game of the bit stream received from the audio signal encoding apparatus 110.

In step 420, the concatenation vector generation unit 122 may generate a concatenation vector by concatenating a previous latent vector reconstructed from a previous frame of the bit seam with the current latent vector generated in step 410.

In step 430, the decoding unit 123 may restore the audio signal by decoding the concatenation vector generated in step 420. In this case, the decoding unit 123 may decode the concatenation vector by inputting it into a decoding neural network.

Figure 5:
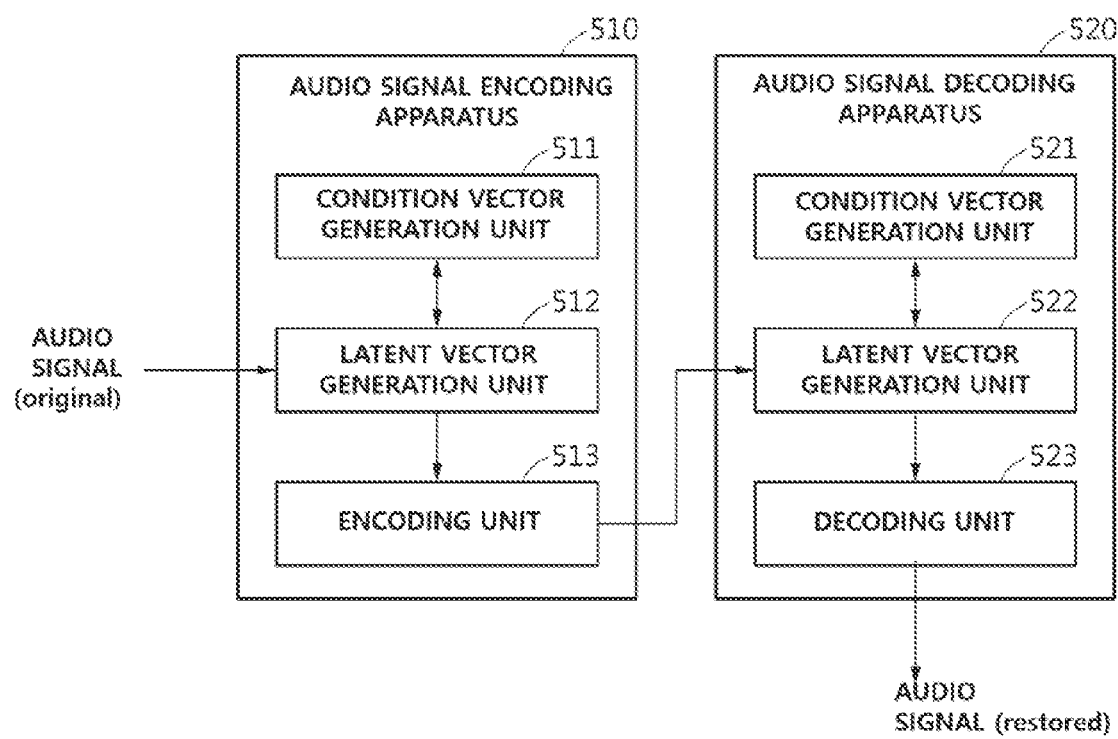
FIG. 5 illustrates an audio signal encoding apparatus and an audio signal decoding apparatus according to a second embodiment of the present invention.

FIG. 5 illustrates an audio signal encoding apparatus and an audio signal decoding apparatus according to a second embodiment of the present invention.

The audio signal encoding apparatus 510 may include a condition vector generation unit 511, a latent vector generation unit 512, and an encoding unit 513, as illustrated in FIG. 5. In this case, the condition vector generation unit 511, the latent vector generation unit 512, and the encoding unit 513 are different processors included in the audio signal encoding apparatus 510, or are executed by one processor.

The condition vector generation unit 511 may generate a condition vector for the current frame of the audio signal by using the previous latent vector generated by reducing the dimension of the previous frame of the audio signal. In this case, the condition vector generation unit 511 may generate a condition vector by projecting the embedding space of the previous latent vector to another dimension. Also, the condition vector generation unit 511 may generate the condition vector by transforming and compressing a previous latent vector in a neural network different from a neural network used to generate the latent vector.

The latent vector generation unit 512 may generate a current latent vector by reducing dimension of the current frame of the audio signal in a neural network to which the condition vector is applied.

The encoding unit 513 may encode and quantize the current latent vector generated by the latent vector generation unit 512 to output a bit stream.

The audio signal decoding apparatus 520 may include a condition vector generation unit 521, a latent vector generation unit 522, and a decoding unit 523, as illustrated in FIG. 5. At this time, the condition vector generation unit 521, the latent vector generation unit 522, and the decoding unit 523 are different processors included in the audio signal decoding apparatus 520, respectively.

The condition vector generation unit 521 may generate a condition vector for the current frame of the audio signal by using the previous latent vector generated by reducing dimension of the previous frame of the bit stream. In this case, the condition vector generation unit 521 may generate a condition vector by projecting the embedding space of the previous latent vector to another dimension. In addition, the condition vector generation unit 521 may generate a condition vector by transforming and compressing a previous latent vector in a neural network different from a neural network used to generate the latent vector.

The latent vector generation unit 522 may generate a current latent vector by reducing dimension of the current frame of the audio signal with a neural network to which the condition vector is applied.

The decoding unit 523 may restore the audio signal by decoding the current latent vector generated by the latent vector generation unit 522.

Figure 6:
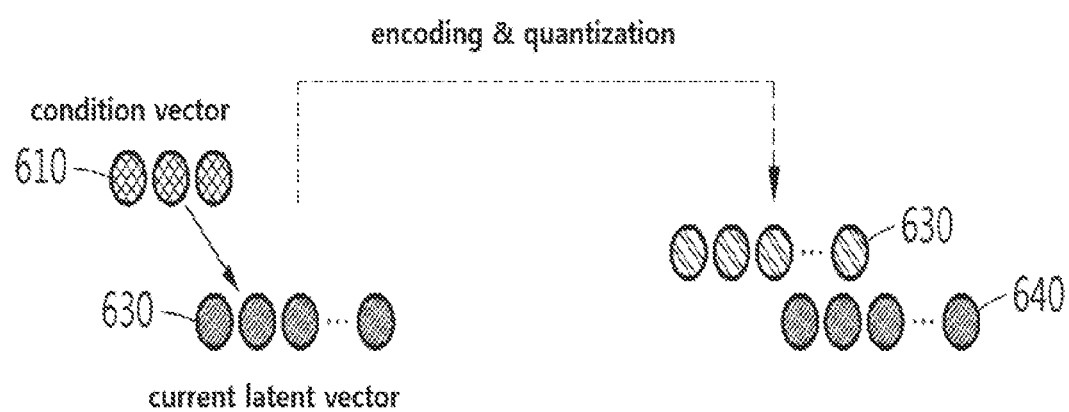
FIG. 6 illustrates a process of encoding and decoding an audio signal according to a second embodiment of the present invention.

FIG. 6 illustrates a process of encoding and decoding an audio signal according to a second embodiment of the present invention.

The audio signal encoding apparatus 510 generates a condition vector 610 using the previous latent vector, compresses the current frame of the audio signal into the current latent vector 630 using the condition vector 610, and then encodes and quantizes for generating a bit stream.

The audio signal decoding apparatus 520 generates a condition vector 630 using the previous latent vector of the bit stream, and compresses the current frame of the bit stream into the current latent vector 640 using the condition vector 630 and decodes for restoring the audio signal.

Figure 7:
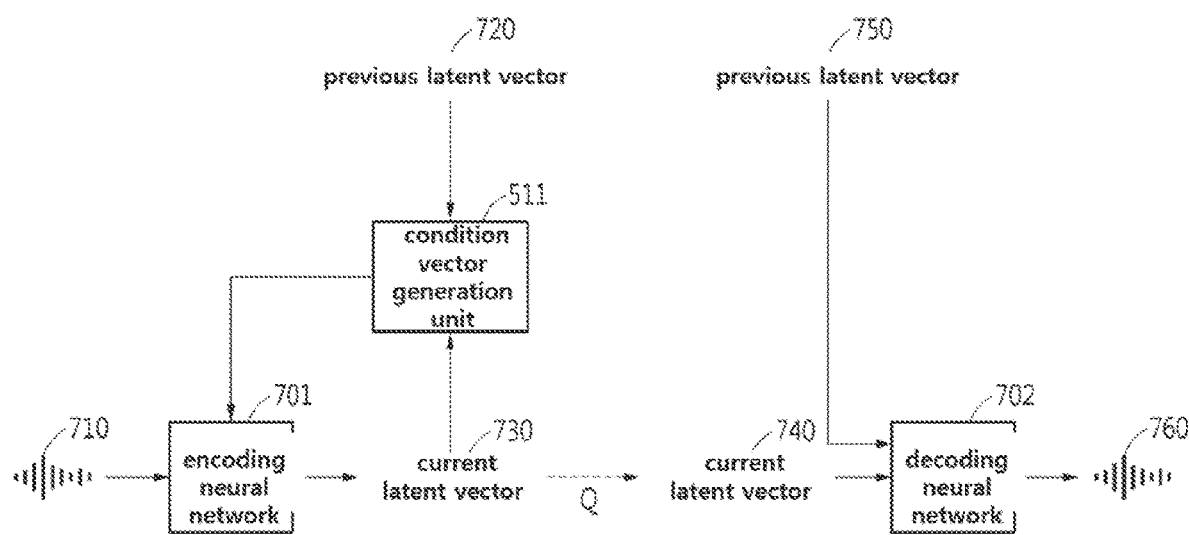
FIG. 7 illustrates an operation of an apparatus for encoding and decoding an audio signal according to a second embodiment of the present invention.

FIG. 7 illustrates an operation of an apparatus for encoding and decoding an audio signal according to a second embodiment of the present invention.

The condition vector generation unit 511 of the audio signal encoding apparatus 510 may generate a condition vector using the previous latent vector 720 and transmit the condition vector to the encoding neural network 701.

After applying the condition vector, the encoding neural network 701 may reduce the dimension of the current frame of the audio signal 710 to generate the current latent vector 730. In this case, the current latent vector 730 may be transmitted to the condition vector generation unit 511. In addition, the condition vector generation unit 511 may generate a condition vector for reducing dimension of the current frame of the audio signal 710 using the previous latent vector 720.

Next, the audio signal encoding apparatus 510 may transmit a bit stream obtained by encoding and quantizing the current latent vector 730 to the audio signal decoding apparatus 520.

The audio signal decoding apparatus 520 may reconstruct the audio signal 760 by inputting and decoding the current latent vector 740 of the bit stream and the previous latent vector 750 of the bit stream to the decoding neural network 702.

Figure 8:
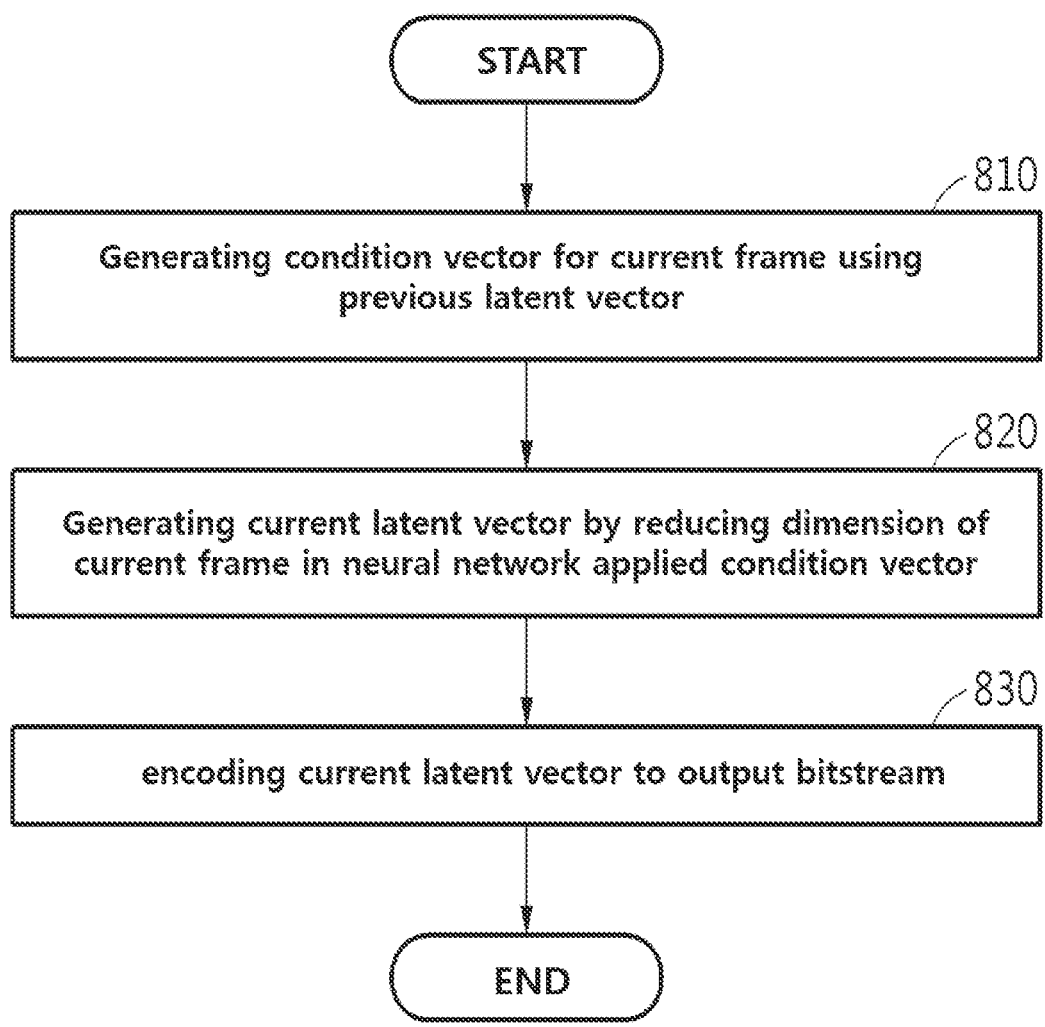
FIG. 8 illustrates a flowchart illustrating a method of encoding an audio signal according to a second embodiment of the present invention.

FIG. 8 illustrates a flowchart illustrating a method of encoding an audio signal according to a second embodiment of the present invention.

In step 810, the condition vector generation unit 511 may generate a condition vector for the current frame of the audio signal by using the previous latent vector generated by reducing dimension of the previous frame of the audio signal. In this case, the condition vector generation unit 511 may generate a condition vector by projecting the embedding space of the previous latent vector to another dimension. Also, the condition vector generation unit 511 may generate the condition vector by transforming and compressing a previous latent vector in a neural network different from a neural network used to generate the latent vector.

In step 820, the latent vector generation unit 512 may generate the current latent vector by reducing dimension of the current frame of the audio signal with a neural network to which the condition vector generated in step 810 is applied.

In step 830, the encoding unit 513 may output a bit stream by encoding and quantizing the current latent vector generated in step 810.

Figure 9:
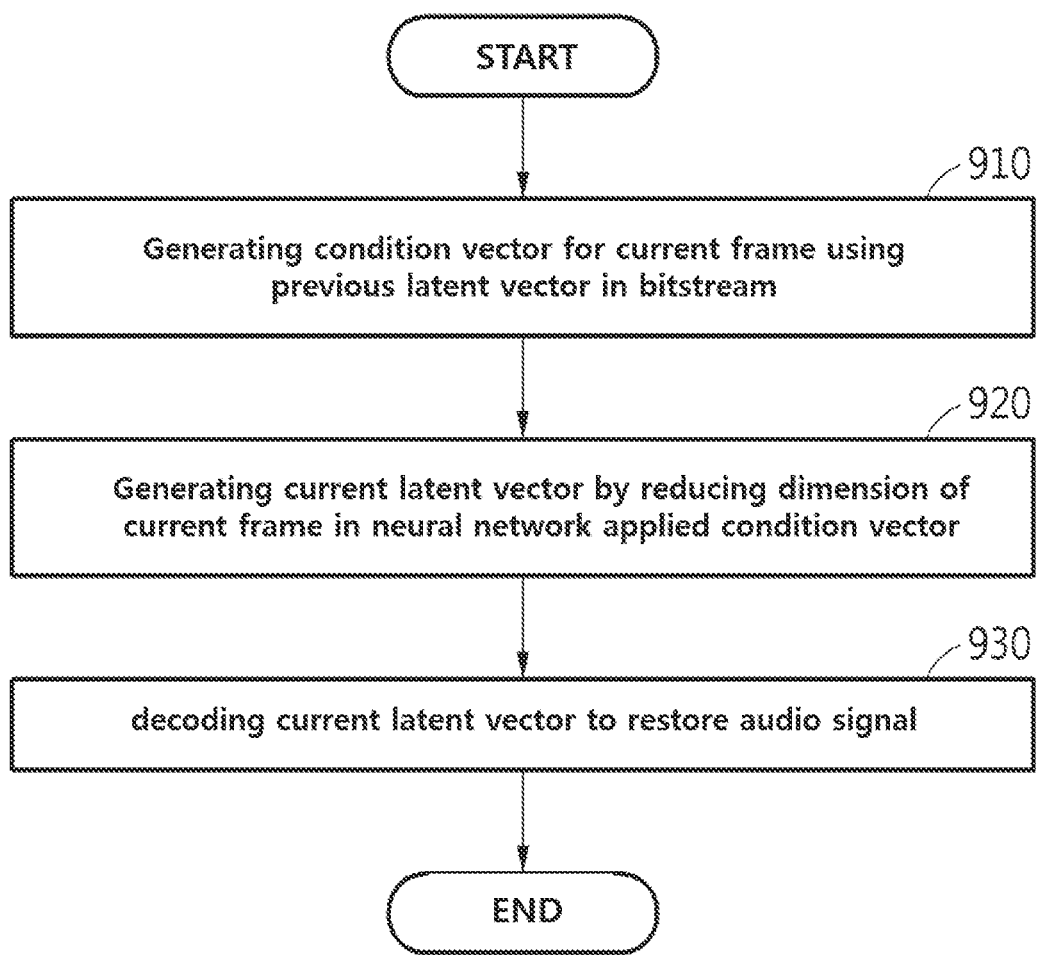
FIG. 9 illustrates a flowchart illustrating a method of decoding an audio signal according to a second embodiment of the present invention.

FIG. 9 illustrates a flowchart illustrating a method of decoding an audio signal according to a second embodiment of the present invention.

In step 910, the condition vector generation unit 521 may generate a condition vector for the current frame of the audio signal by using the previous latent vector generated by reducing dimension of the previous frame of the bit stream.

In step 920, the latent vector generation unit 522 may generate a current latent vector by reducing dimension of the current frame of the audio signal in a neural network to which the condition vector generated in step 910 is applied.

In step 930, the decoding unit 523 may restore the audio signal by decoding the current latent vector generated in step 920.

According to the present invention, information is compressed into a latent vector by reducing dimension of an audio signal, and encoding a latent vector of a previous frame is concatenated with a latent vector of a current frame, thereby enhancing encoding efficiency and improving quality of a reconstructed signal.

The components described in the example embodiments may be achieved by hardware components including at least one DSP (Digital Signal Processor), a processor, a controller, an ASIC (Application Specific Integrated. Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The units and/or modules described herein may be implemented using hardware components, software components, and/or combination thereof. For example, the hardware components may include microphones, amplifiers, bandpass filters, audio to digital convertors, and processing devices. A processing device may be implemented using one or more hardware device configured to carry out and/or execute program code by performing arithmetical, logical, and input/output operations. The processing device may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include a plurality of processing elements and a plurality of types of processing elements. For example, a processing device may include a plurality of processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The components described in the example embodiments may be achieved by hardware components including at least one DSP (Digital Signal Processor), a processor, a controller, an ASIC (Application Specific Integrated. Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for encoding audio signal, comprising:
   generating a current latent vector by reducing a dimension of a current frame of an audio signal;
   generating a concatenation vector by concatenating a previous latent vector generated by reducing a dimension of a previous frame of the audio signal with the current latent vector; and
   encoding and quantizing the concatenation vector to output a bit stream, and
   wherein the generating the current latent vector reduces the dimension of the current frame of the audio signal using a neural network;
   wherein the neural network is trained according to a loss function of the current latent vector calculated by setting the previous latent vector as a conditional probability.

2. The method of claim 1,
   wherein the neural network is trained according to an entropy of the current latent vector calculated by setting the previous latent vector as a conditional probability.

* * * * *